United States Patent [19]

So

[11] Patent Number: 5,528,395
[45] Date of Patent: Jun. 18, 1996

[54] LIQUID CRYSTAL DISPLAY HAVING REFERENCE ELECTRODES EACH FORMED TO BE OVERLAPPED WITH ADJACENT TRANSPARENT ELECTRODES

[75] Inventor: Hoe S. So, Kwacheon-si, Rep. of Korea

[73] Assignee: Goldstar Co., Ltd., Seoul, Rep. of Korea

[21] Appl. No.: 174,426

[22] Filed: Dec. 28, 1993

[30] Foreign Application Priority Data

Dec. 30, 1992 [KR]  Rep. of Korea .................. 26372/1992

[51] Int. Cl.⁶ .......................... G02F 1/136; G02F 1/1333
[52] U.S. Cl. .................................. 359/59; 359/60; 359/61
[58] Field of Search ................................ 359/59, 60, 54, 359/67

[56] References Cited

U.S. PATENT DOCUMENTS

| | | | |
|---|---|---|---|
| 4,759,610 | 7/1988 | Yanagisawa et al. | 359/59 |
| 5,121,237 | 6/1992 | Ikeda | 359/67 |
| 5,191,322 | 3/1993 | Koatayama et al. | 359/60 |
| 5,194,974 | 3/1995 | Hamada et al. | 359/54 |
| 5,282,068 | 1/1994 | Inaba | 359/67 |
| 5,331,447 | 7/1994 | Someya et al. | 359/59 |
| 5,339,181 | 8/1994 | Kim et al. | 359/54 |
| 5,345,324 | 9/1994 | Koseki et al. | 359/59 |

FOREIGN PATENT DOCUMENTS 4-331924  11/1992  Japan .
5-297346  11/1993  Japan .

Primary Examiner—Anita Pellman Gross
Assistant Examiner—Toan Ton
Attorney, Agent, or Firm—John P. White

[57] ABSTRACT

A liquid crystal display device capable of achieving improvements in resolution and aperture ratio. The device includes a plurality of gate signal lines each arranged between neighboring pixel regions in one direction, a plurality of data signal lines each arranged between neighboring pixel regions in a direction perpendicular to the direction of the gate signal lines, a plurality of transparent electrodes each disposed at each corresponding pixel region, a plurality of thin film transistors each having a gate constituted by each corresponding one of the gate signal lines and a source constituted by each corresponding one of the data signal lines, a plurality of diodes each disposed at each corresponding pixel region and forwardly connected to the gate signal line disposed at the front end of each corresponding pixel, and a plurality of reference electrodes each formed to be overlapped with the transparent electrodes of neighboring pixels arranged on both sides of each corresponding data signal line, each of the reference electrodes being connected to the gate signal line disposed at the front end of each corresponding pixel.

3 Claims, 3 Drawing Sheets

LIQUID CRYSTAL DISPLAY HAVING REFERENCE ELECTRODES EACH FORMED TO BE OVERLAPPED WITH ADJACENT TRANSPARENT ELECTRODES

BACKGROUND OF THE INVENTION

The present invention relates to a thin film transistor-liquid crystal display (TFT-LCD) device, and more particularly to a TFT-LCD device free of a reduction in TFT characteristic due to leakage current and a reverse tilt phenomenon caused by a horizontal electric field generated between adjacent signal and pixel electrodes depending on the rubbed direction of liquid crystal.

Generally, TFT-LCD devices include a first transparent substrate formed with TFTs and pixel electrodes and a second transparent substrate formed with color filters and common electrodes. A liquid crystal is filled in a space defined between the first transparent substrate and a second transparent substrate. Polarizing plates for linearly polarizing visible rays are attached to opposed surfaces of the transparent substrates, respectively. Rubbed orientation films are disposed between the first transparent substrate and the liquid crystal and between the liquid crystal and the second transparent substrate, respectively, so as to arrange liquid crystal molecules in one direction.

As image signal voltages are selectively applied to pixels in such TFT-LCD devices, the arrangement of liquid crystal molecules is varied depending on the applied voltages, thereby displaying an image.

Examples of such conventional TFT-LCD devices will now be described.

FIG. 1 is a layout view illustrating one pixel region of a conventional TFT-LCD device. As shown in FIG. 1, this TFT-LCD device includes gate signal lines 1 and 1a, and data signal lines 2 and 2a extending in perpendicular to the gate signal lines. The gate and data signal lines are arranged along boundaries between neighboring pixels, respectively. At the pixel region, a transparent electrode 4 is disposed. A thin film transistor 3 is provided between the transparent electrode 4 and a cross area of the gate and data signal lines 1 and 2.

The thin film transistor 3 has a gate constituted by the gate signal line 1, a source constituted by the data signal line 2 and a drain connected to the transparent electrode 4.

On the other hand, FIG. 2 is a layout view illustrating one pixel region of another conventional TFT-LCD device. This TFT-LCD device is similar to the TFT-LCD device of FIG. 1, except that the gate signal line 1a disposed at the front end of the pixel is partially protruded over the pixel region so that it is overlapped with the transparent electrode 4. In other words, the TFT-LCD device of FIG. 2 includes an accumulation capacitor 6 provided by the overlap between the gate signal line 1a and the transparent electrode 4. This accumulation capacitor 6 serves to prevent the transparent electrode 4 from being varied in potential when the thin film transistor 3 is electrically cut off because of a conversion of a selection signal on the gate signal line 1 into a non-selection signal.

Operation of each of the conventional TFT-LCD devices will now be described.

A voltage or a charge applied to the liquid crystal capacitor formed by the area of the transparent electrode (pixel electrode) is determined by image information. For achieving a transmission of a voltage signal required for the transparent electrode 4, accordingly, a selection signal is applied for a predetermined time through the gate signal line 1.

By this selection signal, the thin film transistor is electrically activated to transmit the image signal voltage applied to the data signal line 2 to the transparent electrode 4. As the image signal voltage is transmitted to the transparent electrode 4, the arrangement of liquid crystal molecules is changed to display an image.

When the selection signal applied to the gate signal line 1 is converted into a non-selection signal after the predetermined time has elapsed, the thin film transistor is electrically cut off. As a result, no image signal voltage is transmitted to the transparent electrode 4. However, the charge accumulated in the transparent electrode 4 is maintained for a frame time until a next selection signal is applied.

For such a non-selection gate signal time interval, the image signal voltage of the transparent electrode 4 is gradually decreased because of leakage current from the thin film transistor 3 and leakage current from the liquid crystal.

This effect, namely, a degradation in image signal caused by the leakage currents from the thin film transistor and the liquid crystal can be reduced by overlapping the gate signal line disposed at the front end of the pixel with the transparent electrode to provide the accumulation capacitor 6 using the gate insulating film as its dielectric layer, as shown in FIG. 2

In the conventional TFT-LCD devices, however, a reverse tilt occurs because horizontal electric fields are present between the transparent electrode and the gate signal line adjacent to the transparent electrode and between the transparent electrode and the data signal line adjacent to the transparent electrode, respectively, depending on the rubbed direction of the orientation film.

In FIGS. 1 and 2, regions where such a reverse tilt occurs are shown and denoted by the reference numeral 5. Since the reverse tilt regions 5 allows light beams to pass therethrough when the image signal is dark, they serve as a factor of degrading the picture quality of the LCD.

This problem may be solved by a photo-shield metal film formed on an electrode substrate opposed to the transparent electrode 4 and adapted to photo-shield the reverse tilt region 5.

However, regions respectively ranged in certain distances A and B from the gate signal line 1a and the data signal line 2a can not be actual effective display areas because the reverse till regions 5 are photo-shielded. In the case of FIG. 2, the pixel may not be driven due to electrical defects caused by pin holes possibly present between the gate signal line 1a and the transparent electrode 4 at the region corresponding to the accumulation capacitor 6. As a result, the total effective display area is reduced, resulting in a degradation in yield.

SUMMARY OF THE INVENTION

The present invention has been made in view of the above-mentioned problems and an object of the invention is to provide a liquid crystal display device capable of achieving improvements in effective display area and yield by reducing the accumulation capacitor area formed on a gate signal line disposed at the front end of each pixel while providing separate accumulation capacitors at ineffective display regions on both sides of each transparent electrode.

In accordance with the present invention, this object can be accomplished by providing a liquid crystal display device comprising: a plurality of gate signal lines each arranged between neighboring pixel regions in one direction and adapted to apply a drive signal for each pixel; a plurality of data signal lines each arranged between neighboring pixel regions in a direction perpendicular to the direction of the gate signal lines and adapted to apply an image signal; a plurality of transparent electrodes each disposed at each corresponding pixel region and adapted to drive each corresponding liquid crystal cell upon receiving the image signal; a plurality of thin film transistors each having a gate constituted by each corresponding one of the gate signal lines and a source constituted by each corresponding one of the data signal lines, each of the thin film transistors being adapted to switch the image signal to each corresponding transparent electrode; a plurality of diodes each disposed at each corresponding pixel region and forwardly connected to the gate signal line disposed at the front end of each corresponding pixel; and a plurality of reference electrodes each formed to be overlapped with the transparent electrodes of neighboring pixels arranged on both sides of each corresponding data signal line, each of the reference electrodes being connected to the gate signal line disposed at the front end of each corresponding pixel.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
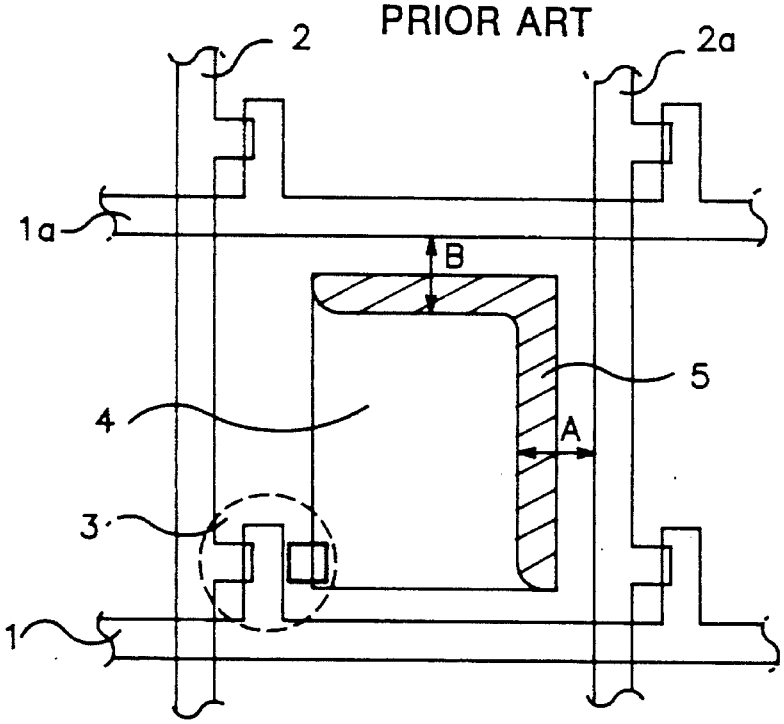
FIG. 1 is a layout view illustrating one pixel region of a conventional TFT-LCD device.
Figure 2:
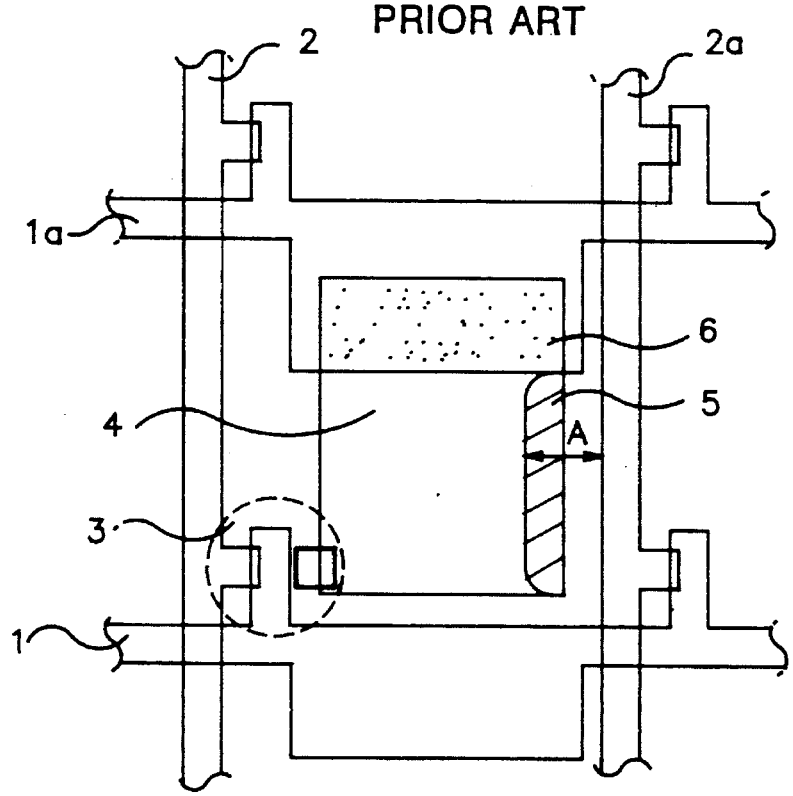
FIG. 2 is a layout view illustrating one pixel region of another conventional TFT-LCD device.
Figure 3:
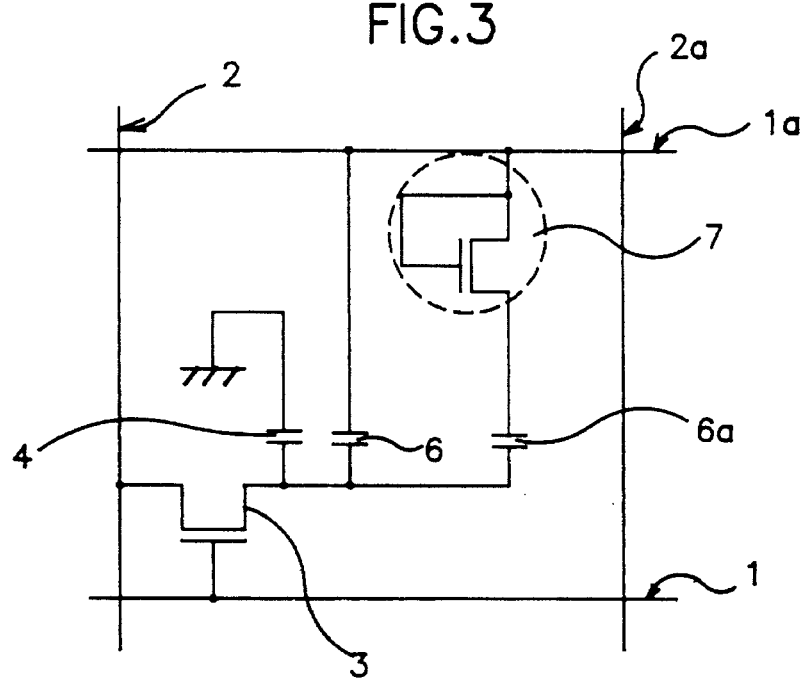
FIG. 3 is a concept diagram of one pixel region of the TFT-LCD device in accordance with the present invention.
Figure 4:
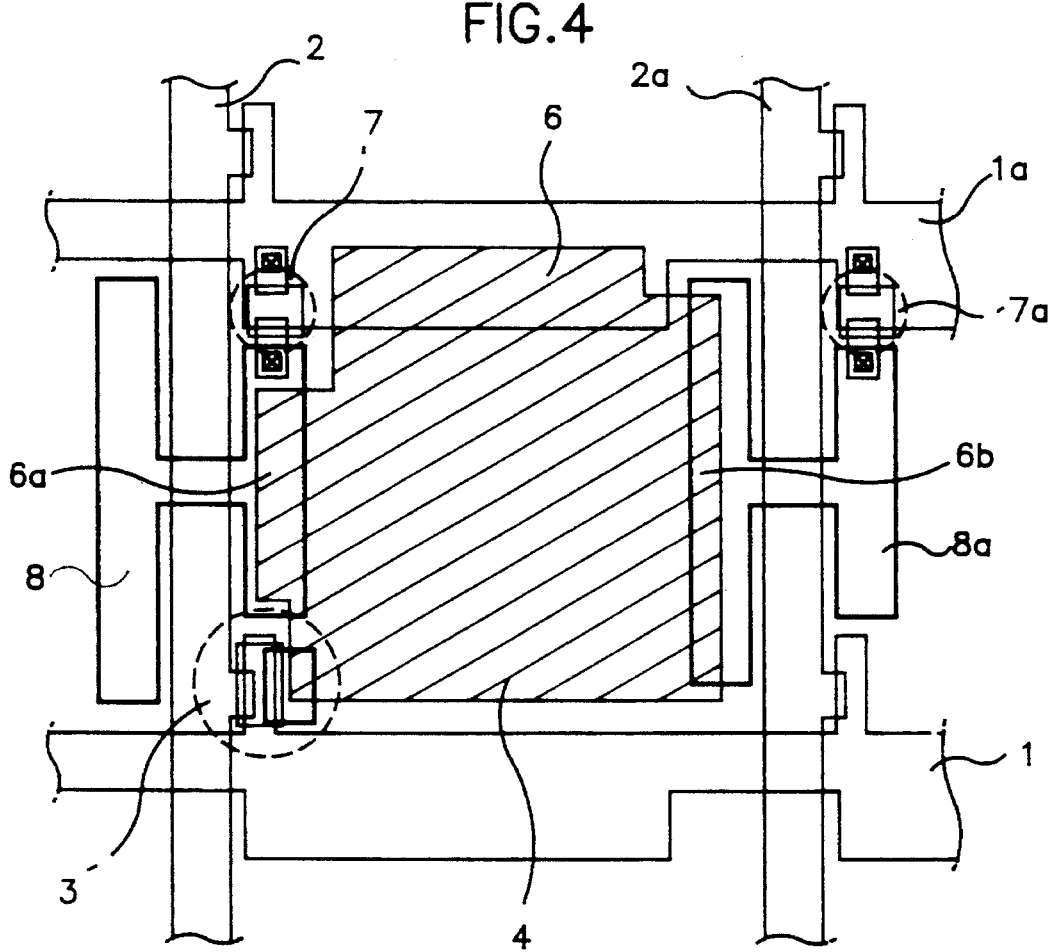
FIG. 4 is a layout view of one pixel region of the TFT-LCD device of FIG. 3.
Figure 5:
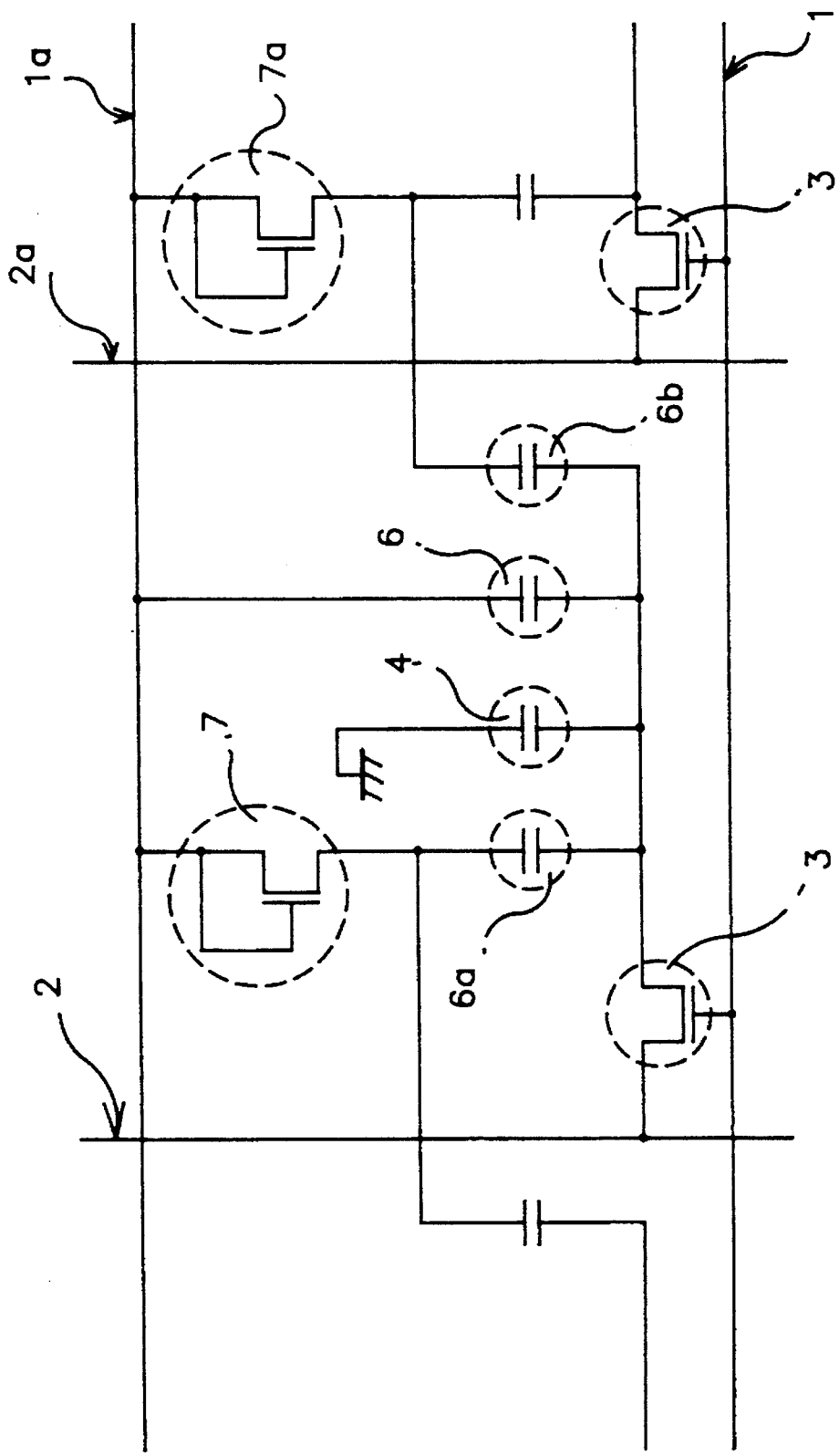
FIG. 5 is a circuit diagram of an equivalent circuit of the TFT-LCD device of FIG. 4.

Referring to FIGS. 3 to 5, there is illustrated a TFT-LCD device in accordance with the present invention.

FIG. 3 is a concept diagram of one pixel region of the TFT-LCD device in accordance with the present invention. FIG. 4 is a layout view of one pixel region of the TFT-LCD device of FIG. 3. FIG. 5 is a circuit diagram of an equivalent circuit of the TFT-LCD device of FIG. 4.

As shown in FIGS. 3 to 5, the TFT-LCD device includes a plurality of uniformly spaced gate signal lines 1 and 1a each arranged between neighboring pixel regions in one direction and adapted to apply a drive signal, a plurality of uniformly spaced data signal lines 2 and 2a each arranged between neighboring pixel regions in a direction perpendicular to the direction of the gate signal lines and adapted to apply an image data signal, and a plurality of transparent electrodes 4 each disposed at each corresponding pixel region and adapted to drive each corresponding liquid crystal cell upon receiving an image data signal. For the simplicity of illustration, FIGS. 3 to 5 show only a construction of unit liquid crystal cell including two gate signal lines 1 and 1a, two data signal lines 2 and 2a, and one transparent electrode 4. The TFT-LCD device further includes a plurality of thin film transistors 3 each having a gate constituted by the gate signal line 1 or 1a disposed at each pixel portion where each gate signal line 1 or 1a crosses each data signal line 2 or 2a, a source electrode constituted by the data signal line 2 or 2a, and a drain electrode connected to each corresponding transparent electrode 4. Each thin film transistor 3 serves as a switching element for applying the image data signal to each corresponding transparent electrode 4 according to a drive signal.

In each pixel, the transparent electrode 4 and the gate signal line (in the figures, 1a) disposed at the front end of the pixel are overlapped with each other to construct a first accumulation capacitor 6. To the front gate line 1a of each pixel, a diode 7 or 7a is forwardly connected at one terminal thereof. The other terminal of the diode 7 or 7a is connected to a reference electrode 8 or 8a.

The reference electrodes 8 and 8a are comprised of opaque electrodes adapted to shield a reverse tilt region from light. Each reference electrode 8 or 8a has a H-shape including a pair of wings to be symmetrically arranged with respect to each corresponding data line 2 or 2a. The wings of each reference electrode 8 or 8a are overlapped with respective portions of transparent electrodes 4 of neighboring pixels including the data signal line 2 or 2a therebetween, at the reverse tilt regions respectively defined between the data line 2 and the transparent electrode 4 and between the data line 2a and the transparent electrode 4. By such an overlap of each reference electrode 8 with neighboring transparent electrodes 4, a second accumulation capacitor 6a and a third accumulation capacitor 6b are formed.

In each pixel, the second accumulation capacitor 6a is constituted by the reference electrode 8 connected with the diode 7 of the corresponding pixel region and the transparent electrode 4 whereas the third accumulation capacitor 6b is constituted by the reference electrode 8a connected with the diode 7a of the neighboring pixel region and the transparent electrode 4.

Each diode 7 or 7a is constituted by a thin film transistor which is connected at its gate and source in common to the gate signal line 1a disposed at the front end of each corresponding pixel and at its drain to the reference electrode 8 or 8a.

Operation of the TFT-LCD device having the above-mentioned arrangement will now be described.

When the gate signal line 1a disposed at the front end of each pixel receives a selection signal indicative of the highest positive (+) voltage, the reference electrodes 8 and 8a for the accumulation capacitors 6a and 6b in the same pixel have a selection signal difference of the gate signal line 1a. This is because the reference electrodes 8 and 8a are connected to the gate signal line 1a via the diodes 7 and 7a, respectively.

As a result, the reference electrodes 8 and 8a of the accumulation capacitors 6a and 6b once having the highest positive voltage maintain the selection signal difference of the gate signal line 1a at a predetermined level by virtue of the reverse characteristic of the diodes 7 and 7a, even though the signal state of the gate signal line 1a is changed to a non-selection signal state.

Even if an electrical conduction phenomenon occurs due to pin holes formed at the accumulation capacitors 6a and 6b, the reference electrodes 8 and 8a maintain the same voltage level as the transparent electrodes 4. As the reference electrodes 8 and 8a receive an image voltage from the thin film transistors 3 and 3a connected to the transparent electrodes 4, respectively, they maintain the level of the received image voltage. Since the image voltage level is higher than the signal level of the gate signal line 1a disposed at the front end of the pixel, the reference electrodes 8 and 8a are electrically isolated by the diodes 7 and 7a. As a result, the transparent electrodes 4 can operate normally.

The TFT-LCD device in accordance with the present invention has the following effects:

First, an improvement in aperture ratio can be achieved because accumulation capacitors are provided at reverse tilt regions and pixel regions unused due to design standard;

Second, an improvement in yield is achieved because a plurality of accumulation capacitors (three accumulation capacitors) are provided at each pixel region so that even though a failure occurs in one of the accumulation capacitors due to pin holes, a normal operation can be performed by the remaining accumulation capacitors;

Third, an increase in capacitance can be obtained because a plurality of accumulation capacitors are provided at each pixel region; and Fourth, the black matrix design tolerance can be reduced because the reference electrodes provided at the reverse tilt regions serve to shield leakage light.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A liquid crystal display device comprising:

a plurality of gate signal lines and a plurality of data signal lines, the gate and data signal lines being arranged in a matrix;

a plurality of thin film transistors (TFTs), each of the transistors having a gate, a source and a drain electrodes and each disposed at an intersecting point of corresponding pair of the plurality of the gate and data signal lines;

a plurality of pixel electrodes, each of the pixel electrodes being connected to the drain or source electrode;

a plurality of reference electrodes each formed to be overlapped with adjacent transparent electrodes which have a data signal line in between them; and a diode connected to the reference electrode and the adjacent gate signal line;

wherein the overlapped regions between the reference electrode and the pixel electrode function as storage capacitors.

2. A liquid crystal display device according to claim 1, wherein the reference electrode functions as a light shielding layer.

3. A liquid crystal display device according to claim 1, wherein the diode has a gate, a source and a drain electrodes, the gate and the source electrodes connected to the adjacent gate signal line and the drain electrode connected to the reference electrode.

* * * * *